United States Patent
Brown et al.

(10) Patent No.: US 7,337,805 B2
(45) Date of Patent: Mar. 4, 2008

(54) VALVE WITH ADJUSTABLE STOP

(75) Inventors: Ronnie Brown, Streetsboro, OH (US);
Carmen J. DeLisio, Mentor, OH (US);
Gary Scheffel, Streetsboro, OH (US);
David Stedman, Mentor, OH (US);
Jared Timko, Mentor, OH (US)

(73) Assignee: Swagelok Company, Solon, OH (US)

( * ) Notice: Subject to any disclaimer, the term of this patent is extended or adjusted under 35 U.S.C. 154(b) by 70 days.

(21) Appl. No.: 10/708,495

(22) Filed: Mar. 8, 2004

(65) Prior Publication Data

US 2004/0244850 A1    Dec. 9, 2004

Related U.S. Application Data

(60) Provisional application No. 60/481,904, filed on Jan. 16, 2004, provisional application No. 60/452,772, filed on Mar. 7, 2003.

(51) Int. Cl.
*F16K 31/22* (2006.01)
*F15B 15/24* (2006.01)

(52) U.S. Cl. ............... 137/625.33; 251/285; 92/13.6

(58) Field of Classification Search ........... 137/625.5, 137/625.33; 251/60, 285; 92/13, 13.6, 111, 92/110, 112
See application file for complete search history.

(56) References Cited

U.S. PATENT DOCUMENTS

| | | | |
|---|---|---|---|
| 697,097 A * | 4/1902 | Mayer | 137/486 |
| 2,593,047 A * | 4/1952 | Mercier et al. | 137/496 |
| 2,605,748 A * | 8/1952 | Rasoletti | 92/5 R |
| 2,716,395 A * | 8/1955 | Pettigrew et al. | 60/376 |
| 2,855,176 A | 10/1958 | Boteler | |
| 3,138,073 A * | 6/1964 | Whitehouse | 92/13 |
| 3,175,473 A | 3/1965 | Boteler et al. | |
| 3,512,550 A * | 5/1970 | Ammann | 137/553 |
| 3,729,168 A * | 4/1973 | Natho et al. | 251/60 |
| 3,739,693 A * | 6/1973 | Puster | 92/13 |
| 3,802,462 A | 4/1974 | Trosch | |
| 4,014,514 A | 3/1977 | Priese et al. | |
| 4,180,239 A | 12/1979 | Valukis | |

(Continued)

FOREIGN PATENT DOCUMENTS

DE    3829783    6/1989

(Continued)

OTHER PUBLICATIONS

Smaller Size Better Quality, SAV Series, Advance, 1998.

(Continued)

*Primary Examiner*—John Fox
(74) *Attorney, Agent, or Firm*—Calfee, Halter & Griswold LLP (57) ABSTRACT

An adjustable mechanism for a valve or actuator is provided. The adjustable mechanism cooperates with one or more pistons, which in turn cooperates with a valve element to limit the axial displacement of the valve element relative to the valve seat. The adjustable mechanism can be adjusted axially, thereby providing a greater or lesser distance for the piston and diaphragm to travel. Embodiments incorporating the adjustable mechanism include a trickle valve, an on/off valve and a mixing valve. The adjustable mechanism also provides to the adjustment of the piston stroke to match or closely mirror the stroke of the vale element.

37 Claims, 10 Drawing Sheets

U.S. PATENT DOCUMENTS

| | | | | |
|---|---|---|---|---|
| 4,242,947 | A | * | 1/1981 | Renner et al. ................. 92/108 |
| 4,249,458 | A | * | 2/1981 | Massing ..................... 92/13.1 |
| 4,505,451 | A | | 3/1985 | Jonas |
| 4,588,163 | A | | 5/1986 | Christensen |
| 4,614,328 | A | | 9/1986 | Zeadman et al. |
| 4,685,653 | A | | 8/1987 | Kaltenthaler et al. |
| 4,748,899 | A | * | 6/1988 | Cote ......................... 92/13.6 |
| 4,815,692 | A | | 3/1989 | Loiseau et al. |
| 4,870,889 | A | * | 10/1989 | Wall .............................. 91/49 |
| 4,899,642 | A | * | 2/1990 | Hwang ........................ 91/510 |
| 4,968,003 | A | | 11/1990 | Danko |
| 5,108,072 | A | | 4/1992 | Kragten |
| 5,112,027 | A | | 5/1992 | Hanyu et al. |
| 5,228,380 | A | * | 7/1993 | Stoll et al. .................. 92/85 B |
| 5,279,328 | A | | 1/1994 | Linder et al. |
| 5,390,895 | A | | 2/1995 | Iwabuchi |
| 5,439,197 | A | | 8/1995 | Itoi et al. |
| 5,551,477 | A | | 9/1996 | Kanno et al. |
| 5,647,397 | A | | 7/1997 | Heiniger et al. |
| 5,746,110 | A | * | 5/1998 | Stoll ......................... 92/13.6 |
| 5,876,189 | A | * | 3/1999 | Lukas et al. ................. 417/392 |
| 5,924,441 | A | | 7/1999 | Leys et al. |
| 5,950,675 | A | | 9/1999 | Minami et al. |
| 5,950,924 | A | | 9/1999 | Hatakeyama et al. |
| 6,029,903 | A | | 2/2000 | Fukano et al. |
| 6,123,320 | A | | 9/2000 | Perusek et al. |
| 6,196,523 | B1 | | 3/2001 | Miyata et al. |
| 6,244,563 | B1 | | 6/2001 | Ejiri |
| 6,460,825 | B1 | | 10/2002 | Nortier et al. |
| 6,481,460 | B2 | | 11/2002 | Fukano et al. |
| 6,585,226 | B2 | | 7/2003 | Fukano et al. |
| 6,595,240 | B2 | | 7/2003 | Leys et al. |
| 6,629,544 | B2 | | 10/2003 | Nakajima et al. |
| 6,814,338 | B2 | | 11/2004 | Kajitani |
| 2002/0002999 | A1 | | 1/2002 | Uchino et al. |
| 2002/0066488 | A1 | | 6/2002 | Leys et al. |
| 2003/0111622 | A1 | | 6/2003 | Jahn et al. |
| 2004/0244850 | A1 | | 12/2004 | Browne et al. |
| 2006/0191777 | A1 | | 8/2006 | Glime |

FOREIGN PATENT DOCUMENTS

| | | |
|---|---|---|
| DE | 4442744 | 6/1996 |
| JP | 7-1381 | 1/1995 |
| WO | WO 2006/089110 | 8/2006 |

OTHER PUBLICATIONS

Ultrahigh-Purity Fluoropolymer Diaphragm Valves, Swagelok Company, Jul. 2002.
One page brochure, Service Instructions MS-CRD-0047, Apr. 1995, Swagelok Company, CA & CPA Series Check Valve Cracking Pressure Adjustment.

* cited by examiner

VALVE WITH ADJUSTABLE STOP

CROSS REFERENCE TO RELATED APPLICATIONS

This application is claims the benefit of U.S. Provisional Application Nos. 60/452,772 and 60/481,904 filed Mar. 7, 2003 and Jan. 16, 2004, respectively, the entire disclosures of which are hereby incorporated by reference.

BACKGROUND OF INVENTION

Many diaphragm valves utilize pneumatic actuation to control whether the valve is opened or closed. A typical actuator contains one or more pistons that are coupled to a valve diaphragm to move the diaphragm against a valve seat to close the valve. Valves can be normally closed or normally opened. In a normally closed valve, a spring biases the piston and thus the diaphragm against the valve seat to maintain it closed. To open the valve, air pressure is fed into the actuator and acts on the piston face(s) such as to move the piston against the spring force. As the actuator piston moves, it disengages the diaphragm from the valve seat thereby opening the valve to flow. In prior art actuators, the piston is provided with additional travel distance to ensure that the actuator, and valve, is fully open. When evaluating a valve assembly for maximizing valve cycle life, a common failure occurs in the actuator. As such, it is desirable to provide an actuator that maximizes the cycle life of the valve assembly.

SUMMARY OF INVENTION

The present invention is directed to an adjustable mechanism for limiting movement of a valve or actuator. The adjustable mechanism cooperates with one or more pistons to determine the axial distance the diaphragm will travel. By limiting the distance the piston(s) and diaphragm travel, the cycle life of the actuator is increased and the flow of the fluids within the valve can be regulated. For example, a trickle vale or a mixing valve can be formed. In addition, the stroke of the actuator can be set to match the stroke of the valve diaphragm, thereby preventing over-travel of the actuator piston or valve diaphragm. In some embodiments, the adjustable mechanism for limiting movement of a valve or actuator is accessible from the outside of the valve assembly, thereby avoiding the need to disassemble the valve assembly or any portion thereof to make adjustments.

These and other features and advantages of the invention will become apparent in the detailed description and claims to follow, taken in conjunction with the accompanying figures.

BRIEF DESCRIPTION OF DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION

The present invention relates to valves for controlling fluid flow and is applicable to valves of different constructions. In addition, the present invention provides a mechanism for improving cycle life of an actuator through the stroke limitation of the actuator piston. The stroke limitation mechanism provides a positive stop, or other stroke limiting mechanism, for the actuator piston, thereby minimizing or eliminating piston over-travel and maximizing cycle life. The actuator piston stroke limitation also allows for proximity sensing, such as, for example, an inductive proximity sensor, to be used. The stroke limitation aspects of the present invention allows the stroke to be set to a predetermined distance, such as the stroke that is required by the valve diaphragm. As such, an actuator with a larger stroke can be used with a valve with a smaller diaphragm stroke without over-travel of actuator piston or deformation of the valve diaphragm. The present invention also allows for precise and repeatable control of the flow of material through the valve by limiting the stroke to a desired position such that the valve is other than fully open.

Figure 1:
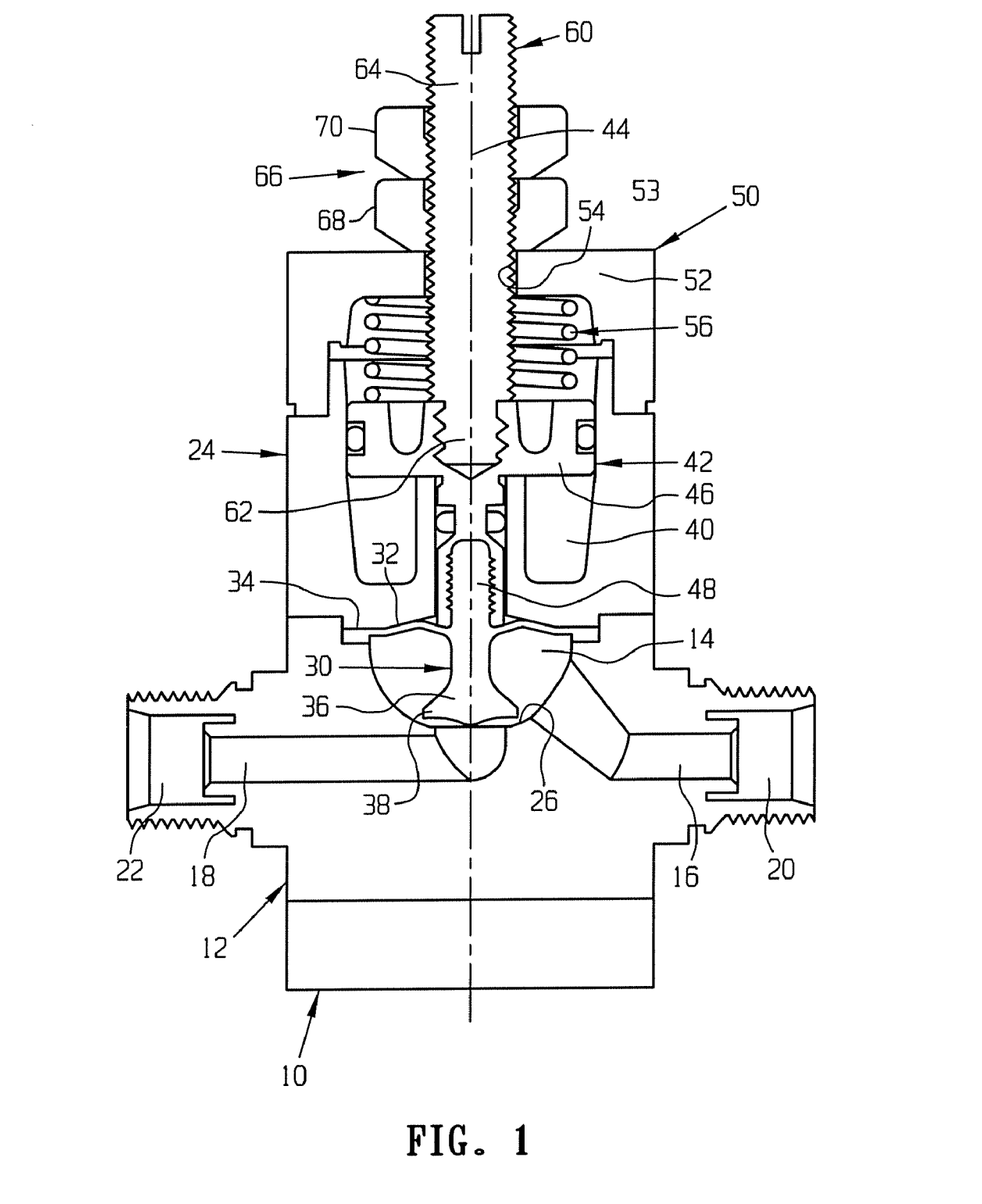
FIG. 1 is a cross-section view of a valve incorporating a first embodiment of the invention described herein.

FIG. 1 illustrates a valve 10 constructed in accordance with a first embodiment of the invention. The valve 10 includes a valve body or base 12. The valve base 12 defines a valve chamber 14 that is connected by first and second passages 16 and 18 to first and second ports 20 and 22, respectively, of the valve 10. The base 12 has a valve seat 26 that is located at the inner terminus of the second passage 18. A housing 24 is secured to the base 12 adjacent the valve chamber 14. Typically, fluid flows into the valve 10 through the first passage 18 and out through the second passage 16. The flow path through the valve 10 could be reversed when required in some applications. Additionally, as would be appreciated by one skilled in the art, the valve 10 can have other configurations and such valves can incorporate the adjustable stroke features described herein below. The invention is thus not limited to diaphragm valves.

A valve member 30 is disposed in the valve chamber 14. The valve member 30 can be of the flexible diaphragm type as shown, for example, in U.S. Pat. No. 6,123,320, the entire disclosure of which is hereby incorporated by reference. The valve member 30 includes a flexible diaphragm 32. An outer peripheral portion 34 of the diaphragm 32 is captured between the valve base 12 and the valve housing 24. A stem portion 36 of the valve member 30 has a tip 38 that is engageable with the valve seat 26 to open and close the second passage 18.

The valve 10 includes a cylinder 40 that is partially defined by the housing 24. A piston 42 is supported in the cylinder 40 for sliding movement relative to the housing 24 along a longitudinal central axis 44 of the valve 10. The piston 42 has an end face 46 that is presented toward the valve chamber 14. An end portion 48 of the valve member 30 is threadedly secured to the piston 42, although other coupling mechanism can also be used.

The housing 24 has a pressurization port (not shown) through which air, or another fluid, under pressure can be admitted into the cylinder 40. Thus, the cylinder 40 can be pressurized so as to exert force on the end face 46 of the piston 42 in an upward direction as viewed in FIG. 1. A cap 50 is secured to the housing 24 opposite the valve base 12. The cap 50 closes the upper end of the cylinder 40. The cap 50 has an annular end wall 52 that forms a spring seat. The end wall 52 has a central opening 54 that is formed as a through hole in the cap 50.

A compression spring 56 is disposed in the valve 10 and acts between the spring seat 52 and the piston 42. The spring 56 biases the piston 42 in a direction toward the valve chamber 14, that is, in a downward direction as viewed in FIG. 1. As a result, the position of the piston 42 in the cylinder 40 is controlled by the interplay between the force of the spring 56, acting in a first direction on the piston 42, and the force of the fluid in the cylinder, acting in an opposite second direction on the piston 42. Because the valve member 30 is secured to the piston 42, the position of the valve member 30 in the valve chamber 14 is also controlled by the interplay between the force of the spring 56 and the opposing force of the fluid in the cylinder 40.

The valve 10 includes an adjuster 60. The adjuster 60 is a rod-like member that extends freely through the central opening 54 in the cap 50. An inner end portion 62 of the adjuster 60 is screwed into the piston 42. As a result, the adjuster 60 is fixed for axial movement with the piston 42 under the influence of forces applied by the spring 56 and by the fluid in the cylinder 40. An outer end portion 64 of the adjuster 60 projects through the central opening 54 of the cap 50. The outer end portion 64 is externally threaded. A lock nut assembly 66 is disposed on the adjuster 60. The lock nut assembly 66 includes a first lock nut 68 and a second lock nut 70. The first lock nut 68 is screwed on the outer end portion 64 of the adjuster 60 into a position in engagement with the end wall 52 of the cap 50. The second lock nut 70 is screwed on the adjuster 60 into a position in engagement with the first lock nut 68. This engagement locks the first lock nut 68 in position on the adjuster 60.

The valve 10 is actuated by admitting fluid under pressure to the cylinder 40. The fluid pressure acts on the piston end face 46 to move the piston 42 upward against the bias of the spring 56. As a result, the valve member 30 moves off the valve seat 26, opening the second passage 18 in the valve base 12. Fluid can flow between the first passage 16 and the second passage 18. When the fluid pressure in the cylinder 40 is released, the force of the spring 56 acts on the piston 42 to move the piston and the valve member 30 in a direction toward the valve seat 26. At this time, the position of the lock nut assembly 66 on the adjuster 60 controls the amount of closing of the valve 10. Specifically, the position of the lock nut assembly 66 on the adjuster 60 controls how far the adjuster 60 and thus the valve member 30 move in a direction toward the valve seat 26, thus setting the amount of closing of the valve 10.

The lock nut assembly 66 can be positioned on the adjuster 60 so that the first lock nut 68 does not engage the outer portion 53 end wall 52 of the cap 50 before the valve member 30 engages the valve seat 26. In this case, the valve 10 closes completely when the fluid pressure to the cylinder 40 is released, and fluid flow through the second passage 18 is blocked. Alternatively, the lock nut assembly 66 can be positioned on the adjuster 60 so that the first lock nut 68 engages the outer portion 53 of the end wall 52 of the cap 50 before the valve member 30 engages the valve seat 26. In this case, the engagement of the first lock nut 68 with the outer portion 53 of the end wall 52 of the cap 50 prevents further movement of the adjuster 60, the piston 42, and the valve member 30 in the closing direction. As a result, the valve 10 is not closed fully when the fluid pressure to the cylinder 40 is released, and fluid flow through the second passage 18 is enabled. The position of the first lock nut 68 can be varied in order to set a predetermined or selectable flow rate through the second passage 18. For example, if the opening that remains between the valve member 30 and the valve seat 26 is small, a trickle flow of fluid through the valve 10 is enabled. The size of the opening can be varied by setting the lock nut assembly 66 at a different position on the adjuster 60. The first lock nut 68 acts as a stop to set how much fluid flow is enabled. The second lock nut 70 locks against the first lock nut 68 to keep the first lock nut from rotating. Although a threaded adjuster and nut are illustrated, non-threaded embodiments may alternatively be used.

Figure 2:
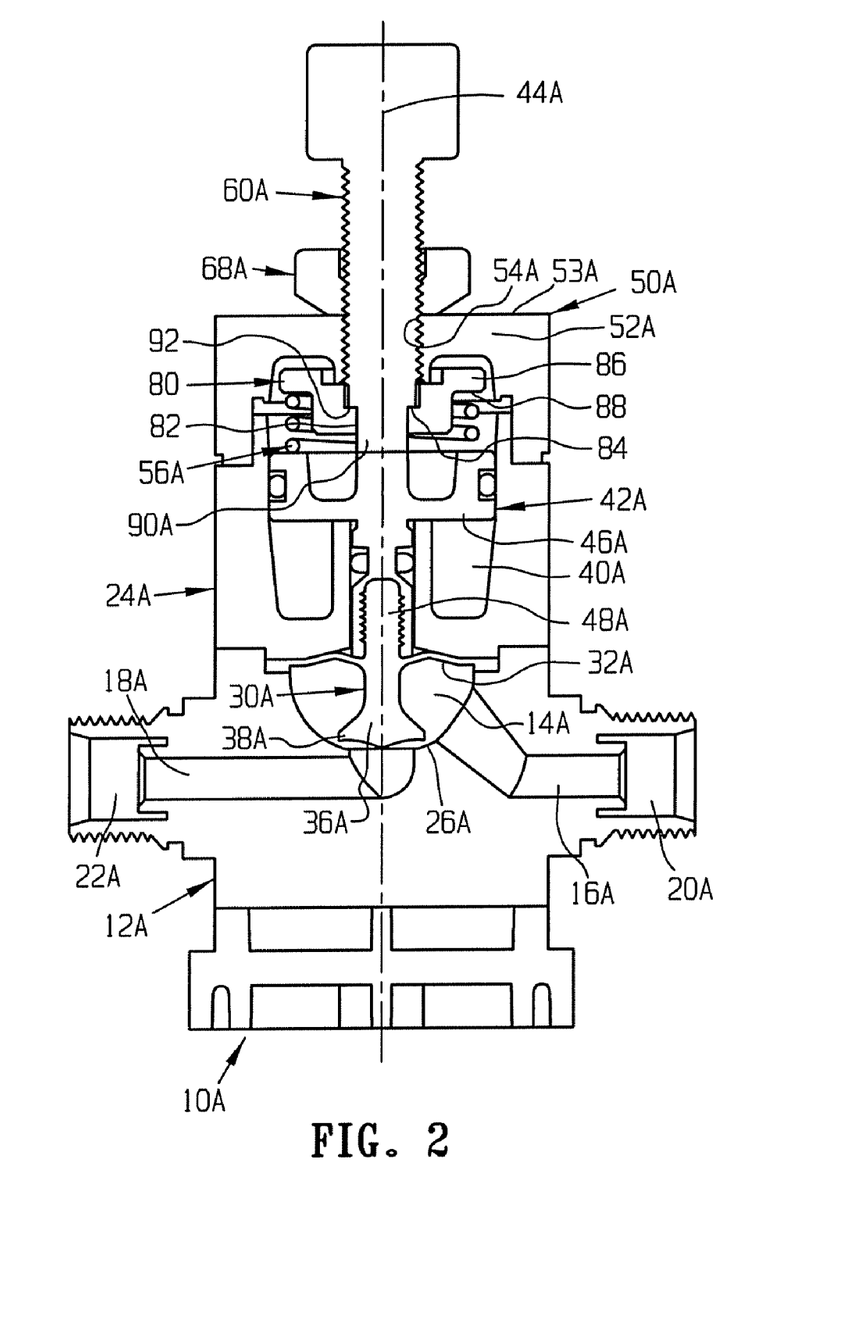
FIG. 2 is a cross-sectional view of a valve incorporating a second embodiment of the invention described herein.

FIG. 2 illustrates a valve 10a constructed in accordance with a second embodiment of the invention. The valve 10a is similar in construction to the valve 10 (FIG. 1). Parts of the valve 10a that are the same as or similar to corresponding parts of the valve 10 are given the same reference numerals with the suffix "a" attached.

The valve 10a includes a valve base 12a, a housing 24a, and a valve member 30a. The valve 10a also includes a cylinder 40a and a piston 42a supported in the cylinder for sliding movement relative to the housing 24a along a longitudinal central axis 44a of the valve. The valve member 30a is threadedly secured to the piston 42a. A cap 50a is secured to the housing 24a opposite the valve base 12a. The cap 50a closes the upper end of the cylinder 40a. The cap 50a has an annular end wall that has an internally threaded central opening 54a.

The valve 10a includes a spring seat 80. The spring seat 80 is formed as a separate member from the cap 50a and is movable relative to the cap 50a. The spring seat 80 has a generally disc-shaped configuration including a circular central opening 82. The central opening 82 is encircled by an annular, radially extending shoulder 84 that faces away from the piston 42a. An outer peripheral portion 86 of the spring seat 80 has a spring engagement surface 88 that faces toward the piston 42a. The position of the spring seat 80 relative to the cap 50a is controlled by an adjuster 60a. The adjuster 60a is a rod-like member that extends through the central opening 82 in the spring seat 80 and through the threaded central opening 54a in the cap 50a. An inner end portion 90 of the adjuster 60a is spaced apart from and movable relative to the piston 42a. The inner end portion 90 of the adjuster 60a includes an annular, radially extending shoulder 92 that faces the valve chamber 14a. The shoulder 92 on the adjuster 60a engages the shoulder 84 on the spring seat 80.

An outer end portion of the adjuster 60a is externally threaded. The outer end portion 64a is screwed into the threaded central opening 54a of the cap 50a and projects axially outward from the cap 50a.

A single lock nut 68*a* is disposed on the adjuster 60*a*. The lock nut 68*a* is threaded on the projecting outer end portion 64*a* of the adjuster 60*a* at a location adjacent the end wall 52*a* of the cap 50. The lock nut 68*a* is screwed on the adjuster 60*a* into a position in engagement with the outer portion 53*a* of the end wall 52*a* of the cap 50*a*. Because the adjuster 60*a* is screwed into the cap 50*a*, the lock nut 68*a* locks the adjuster in position in the valve 10*a* and keeps the adjuster 60*a* from rotating or from moving axially. Because the shoulder 90 on the adjuster 60*a* engages the shoulder 84 on the spring seat 80, the adjuster thereby controls and limits the axially outward movement of the spring seat 80.

A compression spring 56*a* is disposed in the cylinder 40*a* in the valve 10*a*. The spring 56*a* acts between the piston 42*a* and the spring engagement surface 88 of the spring seat 80. The spring 56*a* biases the piston 42*a* in a direction toward the valve chamber 14*a*, that is, in a downward direction as viewed in FIG. 2. As a result, the position of the piston 42*a* in the cylinder 40*a* and the position of the valve member 30*a* in the valve chamber 14*a* are controlled by the interplay between the force of the spring 56*a* and the force of the fluid in the cylinder 40*a*.

The valve 10*a* is opened by admitting fluid under pressure to the cylinder 40*a*. The fluid pressure acts on the piston end face 46*a* to move the piston 42*a* upward against the bias of the spring 56*a*. As a result, the valve member 30*a* moves off the valve seat 26*a*, opening the second passage 18*a* in the valve base 12*a*. Fluid can flow between the first passage 16*a* and the second passage 18*a*. When the fluid pressure in the cylinder 40*a* is released, the force of the spring 56*a* acts on the piston 42*a* to move the piston 42*a* and the valve member 30*a* in a direction toward the valve seat 26*a*, closing the valve 10*a*.

The position of the lock nut 68*a* on the adjuster 60*a* controls the position of the adjuster 60*a* and the spring seat 80 relative to the cap 50*a* and, thereby, controls the amount of spring force needed to open the valve 10*a*. Specifically, the position of the lock nut 68*a* on the adjuster 60*a* controls how much the spring 56*a* is compressed (the amount of spring preload) when the valve 10*a* is in the closed position. The lock nut 68*a* can be positioned on the adjuster 60*a* so that the inner end portion 90*a* of the adjuster 60*a* projects by a relatively large amount into the cylinder 40*a* in the valve 10*a*. The shoulder 92 on the adjuster 60*a* thus maintains the spring seat 80 in a position relatively far (axially inward) from the end wall 52*a* of the cap 50*a*. In this case, the spring 56*a* is compressed to a relatively great extent, and relatively more force is needed to open the valve 10*a*. Alternatively, the lock nut 68*a* can be positioned on the adjuster 60*a* so that the inner end portion 90*a* of the adjuster projects into the cylinder 40*a* by a smaller amount. As a result, the shoulder 92 on the adjuster 60*a* allows the spring seat 80 to assume a position located closer (axially outward) to the end wall 52*a* of the cap 50*a*. In this case, the spring 56*a* is compressed to a lesser extent and the amount of force needed to open the valve 10*a* is relatively less. By varying the position of the locking nut 68*a*, the valve 10*a* can be used with varying loads. This allows the valve 10*a* to serve as a pressure relief valve, a blow-off valve, a water hammer surge-arrestor, or a pressure regulator.

FIGS. 3-7 illustrate a valve 100 constructed in accordance with a third embodiment of the invention. The valve 100 (FIG. 3) includes a valve base 101. The valve base 101 defines a first valve chamber 102 that is connected by a first passage 104 to a first port 106. The valve base 101 defines a second valve chamber 108 that is connected by a second passage 110 to a second port 112. The valve base 101 also defines a connecting passage 114 that extends between and connects the first valve chamber 102 in fluid communication with the second valve chamber 108. The connecting passage 114 terminates in a first outlet opening 116 into the first valve chamber 102 and a second outlet opening 118 into the second valve chamber 108. The first valve chamber 102 has a first valve seat 120 that extends around the first outlet opening 116 into the first valve chamber. The second valve chamber 108 has a second valve seat 122 that extends around the second outlet opening 118 into the second valve chamber. The second valve seat 122 faces in an opposite axial direction from the first valve seat 120. The valve base 101 includes a third (or common) passage 124 that extends between connects the connecting passage 114 and a third port 126 (FIGS. 4-7). The inner terminus of the third passage 124 is shown as a dashed circle in FIG. 3.

Figure 3:
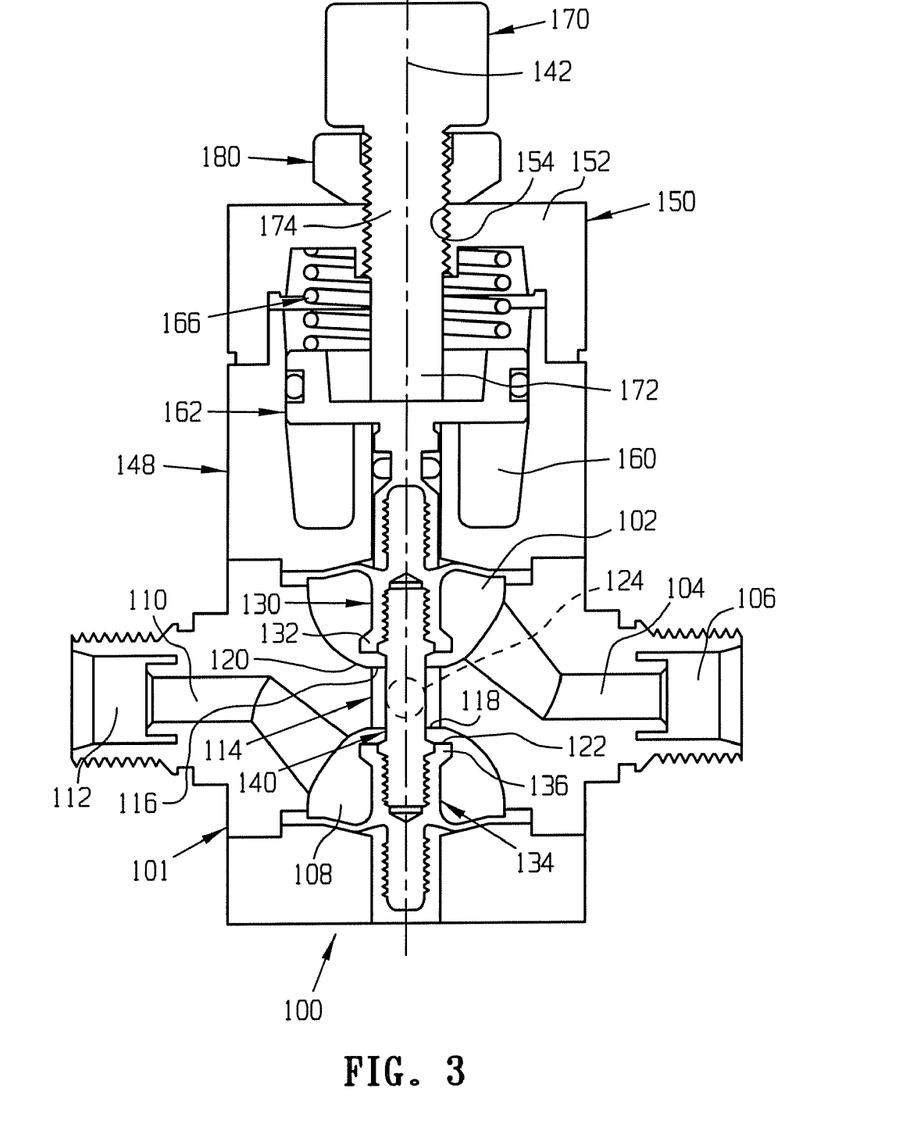
FIG. 3 is a cross-sectional view of a three-way valve incorporating the invention described herein.

The valve 100 includes a first valve member 130 for selectively enabling or blocking fluid communication between the first passage 104 and the connector passage 114. The first valve member 130 has a tip 132 engageable with the first valve seat 120 to block fluid flow between the first valve chamber 102 and the connector passage 114. The valve 100 includes a second valve member 134 for selectively enabling or blocking fluid communication between the second passage 110 and the connector passage 114. The second valve member 134 has a tip 136 engageable with the second valve seat 118 to block fluid flow between the second valve chamber 108 and the connector passage 114.

A connector stem 140 extends through the connector passage 114 and fixes the first and second valve members 130 and 134 for movement with each other. Because the two valve seats 120 and 122 face in opposite directions, reciprocating movement of the connector stem 140 along the axis 142 can cause one valve seat 120 to open when the other valve seat closes 122, and vice versa.

The valve 100 includes a housing 148 connected with the valve base 101 and a cap 150 connected with the housing. The cap 150 has an annular end wall 152 that forms a spring seat. The end wall 152 has an internally threaded central opening 154. The valve 100 also includes a cylinder 160 and a piston 162 supported in the cylinder for sliding movement relative to the housing 148 along the longitudinal central axis 142 of the valve. The first valve member 130 is threadedly secured to the piston 162. In some embodiments, the first and second valve members 130 and 134 can be separate pieces that are coupled together, such as by a threaded coupling. In other embodiments, the first and second valve members 130 and 134 can couple, such as by a threaded coupling, to a central stem portion. Furthermore, the first valve member 130 can be coupled to the piston in other, non-threaded, ways, such as, for example a clipping, a binding, or forming an interlocking engagement. As a result of the coupling to the piston, the first and second valve members 130 and 134, and the connector stem 140, are fixed to the piston 162 for movement with the piston 162. A compression spring 166 is disposed in the valve 100 and acts between a spring seat 152 formed by end wall 152 and the piston 162. The spring 166 biases the piston 162 in a direction toward the valve chambers 102 and 108, that is, in a downward direction as viewed in FIG. 3. As a result, the position of the piston 162 in the cylinder 160 is controlled by the interplay between the force of the spring 166, acting in a first direction on the piston 162, and the force of fluid in the cylinder 160, acting in an opposite second direction on the piston 162. Because the valve members 130 and 134 are secured to the piston 162, the position of the valve members is also controlled by the interplay between the force of the spring 166 and the opposing force of the fluid in the cylinder 160.

The valve 100 includes an adjuster 170. The adjuster 170 is a rod-like member having an inner end portion 172 that extends into the cylinder 160 and abuts the piston 162. An externally threaded outer end portion 174 of the adjuster 170 is screwed into the central opening 154 of the cap 150 and projects out of the cap. A lock nut 180 is threaded on the projecting outer end portion 174 of the adjuster 170 at a location adjacent the end wall 152 of the cap 150. The lock nut 180 is screwed on the adjuster 170 into a position in engagement with the end wall 152 of the cap 150. The lock nut 180 thereby prevents the adjuster 170 from rotating, and also sets the axial position of the adjuster in the valve 100.

The valve 100 is actuated by admitting fluid under pressure to the cylinder 160. The fluid pressure acts on the piston 162 to move the piston upward against the bias of the spring 166. When the fluid pressure in the cylinder 160 is released, the force of the spring 166 acts on the piston to move the piston 162 in a direction toward the valve chambers 102 and 108 (downward as viewed in FIG. 3).

The valve 100 has two possible states or positions of operation. The valve 100 has a first state (not shown) in which the piston 162 is in a fully downward position under the influence of the spring 166. This position results when air pressure to the cylinder 160 is released. When the valve 100 is thus in the first state, the force of the spring 166 pushes the first valve member 134 into engagement with the first valve seat 120. Fluid flow is blocked between the first valve chamber 102 and the connector passage 114 and thus between the first passage 104 and the third passage 124. Fluid can not flow between the first port 106 and the second port 112 or the third port 126. At the same time, because the piston 162 is in a fully downward position, the second valve member 134 is off the second valve seat 122. Fluid can flow between the second valve chamber 108 and the connector passage 114 and thus between the second passage 110 and the third passage 124. The second port 112 and the third port 126 are, thereby, connected in fluid communication.

Figure 4:
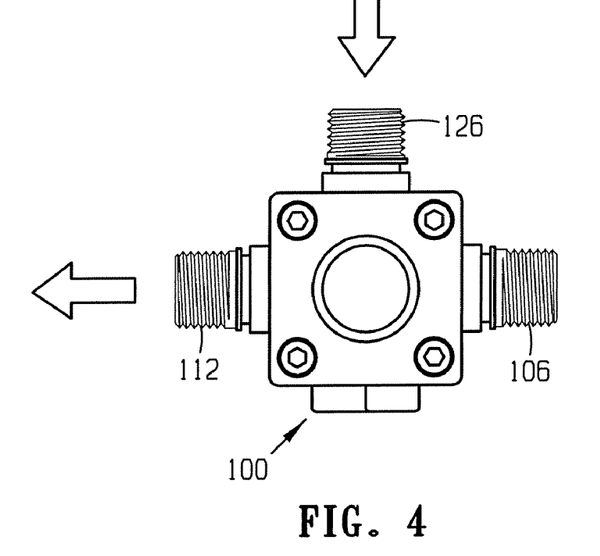
FIG. 4 is a view of the flow path of the three-way valve in the first state.

FIG. 4 illustrates a possible fluid flow pattern through the valve 100 when the valve is in the first state. Fluid can flow into the valve 100 through the third (common) port 126 and flow out of the valve through the second port 112.

The valve 100 has a second state in which the influence of the spring 166 does not move the piston 162 into the fully downward position. This second state results when air under pressure is provided to the cylinder 160 to overcome the force of the spring 166. The piston 162 moves upward in the cylinder 160. The moving piston 162 draws the first valve member 130 off the first valve seat 120, as shown in FIG. 3. As a result, fluid can flow between the first valve chamber 102 and the connector passage 114 and thus between the first passage 104 and the third passage 124. The first port 106 and the third port 126 are, thereby, connected in fluid communication. At the same time, the second valve member 134 is drawn toward the second valve seat 122. If the piston 162 moves upward sufficiently to cause the second valve member 134 to engage the second valve seat 122, fluid flow is blocked between the second valve chamber 108 and the connector passage 114 and thus between the second passage 110 and the third passage 124 and the first passage 104. So positioned, the second port 112 is thereby blocked from fluid communication with the third port 126 and the first port 106.

Figure 5:
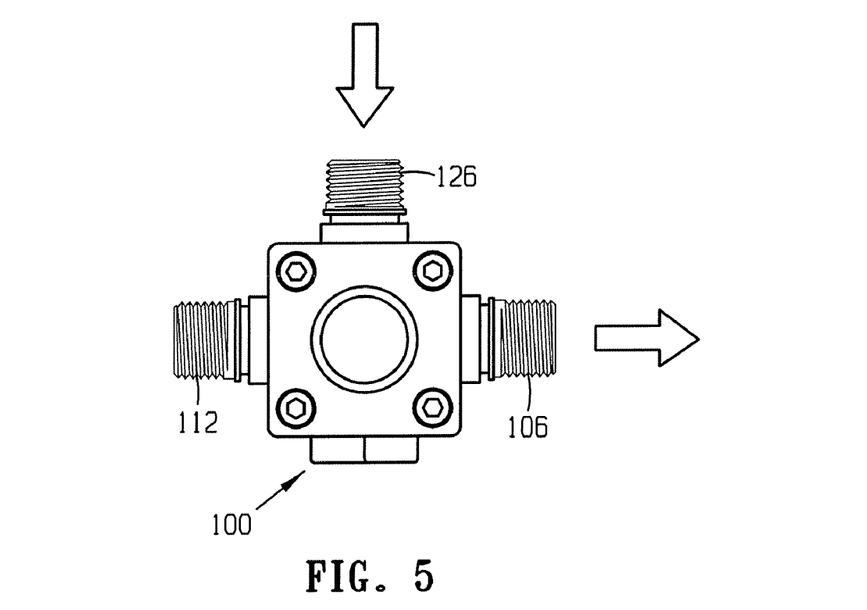
FIG. 5 is a view of the flow path of the three-way valve in the second state.

FIG. 5 illustrates a possible fluid flow pattern through the valve 100 when the valve is in this second state and the piston 162 moves upward sufficiently to close the second valve chamber 108. Fluid can flow into the valve 100 through the third (common) port 126 and flow out of the valve through the first port 106.

In order to achieve the second state wherein the second valve member 134 seals against the second valve seat 122, the adjuster 170 is set outward from the valve end wall 152. Such a setting of the adjuster 170 is accomplished by loosening the lock nut 180 and rotating the adjuster 170 relative to the cap 150 in a direction so as to have more of the adjuster project outward from the cap and less of the adjuster be disposed in the cylinder 160. The lock nut 180 is then tightened down again on the end wall 152 of the cap 150. When the valve 100 is actuated as described above, the inner end portion 172 of the adjuster 170 is relatively far away from the valve chambers 102 and 108 and therefore does not limit upward movement of the piston 162. Such upward movement does not cease until the second valve member 134 engages the second valve seat 122.

On the other hand, the adjuster 170 can be set so that it does limit upward movement of the piston 162. Such a setting of the adjuster 170 is accomplished by loosening the lock nut 180 and rotating the adjuster relative to the cap 150 in a direction so as to have less of the adjuster project outward from the cap and more of the adjuster be disposed in the cylinder 160. The lock nut 180 is then tightened down again on the end wall 152 of the cap 150. When the valve 100 is thereafter actuated with air pressure, the piston 162 moves upwardly only until it engages the inner end portion 172 of the adjuster 170, as shown in FIG. 3. The piston 162 does not move upward enough to cause the second valve member 134 to engage the second valve seat 122. Therefore, fluid flow is not blocked between the second valve chamber 108 and the connector passage 114, and thus is not blocked between the second passage 110 and the third passage 124 and the first passage 104. The second port 112 and the third port 126 and the first port 106 are, thereby, connected in fluid communication.

Figure 6:
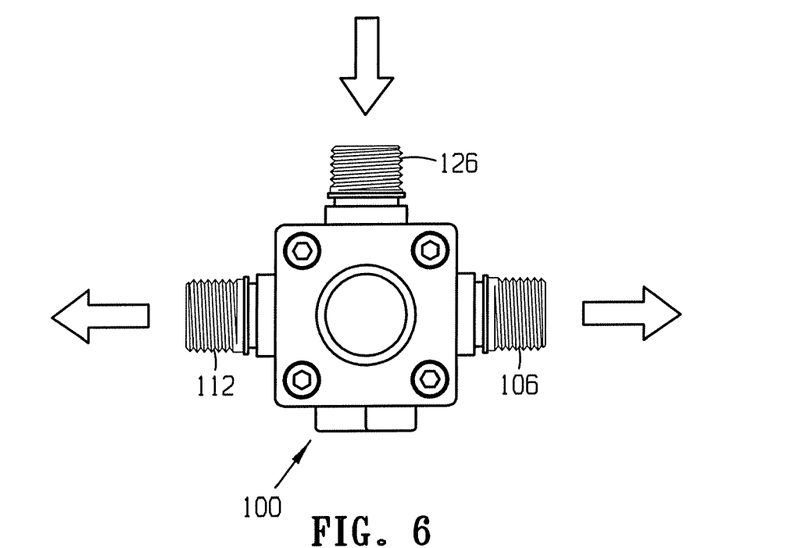
FIG. 6 is a view of the flow path of the three-way valve in the third state, dividing a single flow.
Figure 7:
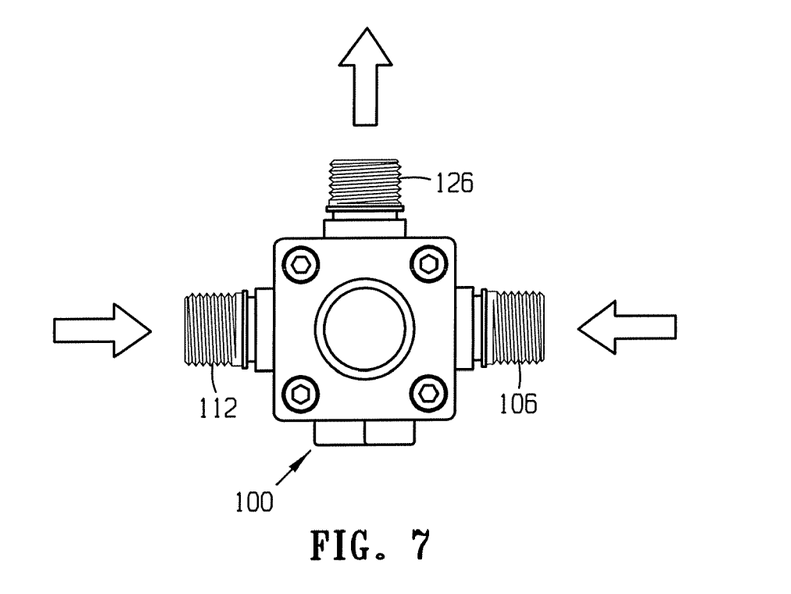
FIG. 7 is a view of the flow path of the three-way valve in the third state, mixing two flows.

FIGS. 6 and 7 illustrate possible fluid flow patterns through the valve 100 when the valve is between the first state and the second state. As illustrated in FIG. 6, fluid can flow into the valve 100 through the third (common) port 126 and flow out of the valve through both the first port 106 and the second port 112. In this manner, a single fluid flow can be split into two separate flows. Alternatively, as illustrated in FIG. 7, fluid can flow into the valve 100 through both the first port 106 and the second port 112 and flow out of the valve through the third (common) port 126. In this manner, the valve 100 acts as a mixing valve with two separate fluids being mixed together.

These flow patterns are created by positioning the adjuster 170 in between the position it is in when in the first state and that which it is in when it is in the second state. Such a setting of the adjuster 170 is accomplished by loosening the lock nut 180 and rotating the adjuster 170 relative to the cap 150. When the adjuster 170 is properly positioned, the lock nut 180 is tightened and the valve 100 is in the third state. In order to determine the location of the adjuster 170 to achieve the first, second and third state, a indicator (not shown) can be provided. For example, the adjuster 170 can be color coded to demonstrate the three states, one color for each state. Additionally, the third state can be divided into relative mixing portions. For example, the indicator can have three colors for the third state, thus a total of five colors. The first color would indicate approximately a 25/75 mixture, the second color would indicate approximately a 50/50 mixture, and the third color would indicate approximately a 75/25 mixture. Alternatively, the indicator can be divided into further sections. The indicator can also use different means of indicating the relative position, such as, for example, numbers, bands or grooves.

Figure 8:
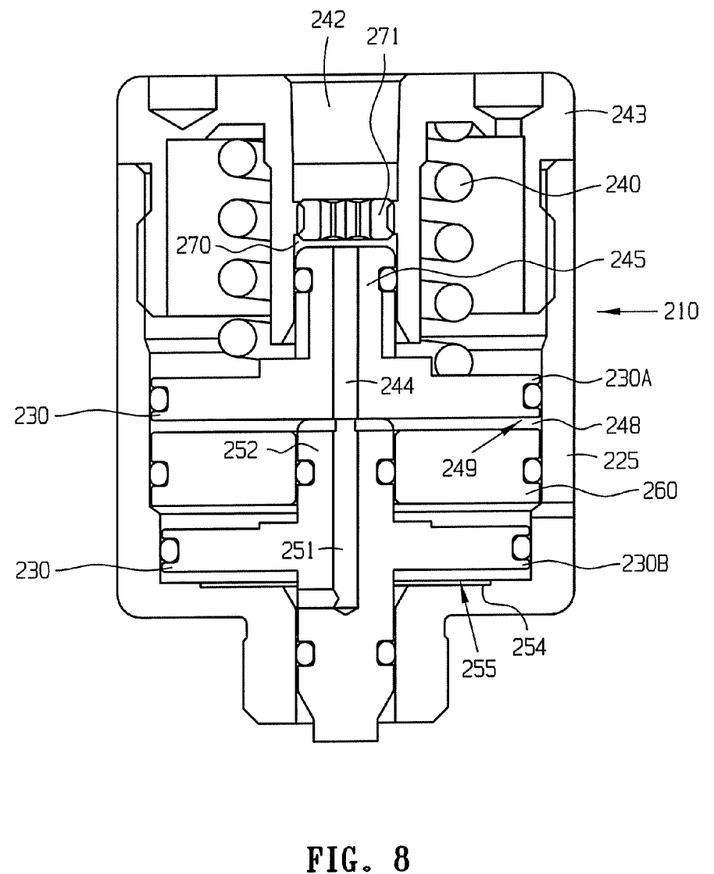
FIG. 8 is a cross-sectional view of an actuator incorporating a single set screw adjustable stop mechanism.

FIG. 8 illustrates a fourth embodiment of the present invention and includes an actuator, generally referenced as 210. The actuator 210 shown in FIG. 8 is a normally closed actuator, although one skilled in the art should appreciate that a normally open actuator can also be used. The actuator 210 includes an actuator housing 225, one or more pistons 230, a spring 240, an inlet port 242 and end cap 243. The spring 240 acts on the pistons 230 to maintain them in a downward position, so that engagement with the valve diaphragm 32 (see FIG. 1) will be maintained. Air enters through inlet port 242 and through flow channel 244 in the stem 245 of the upper piston 230a. Air fills the upper actuation volume 248 and acts on the surface 249 of the upper piston 230a. Air then continues through flow channel 251 in stem 252 of the lower piston 230b. Air fills the lower actuation volume 254 and acts on the surface 255 of the lower piston 230b. The air that fills the upper and lower actuation volumes 248 and 254 and acts on surfaces 249 and 255 causes the pistons 230 to move upward against the force of the spring 240. Although FIG. 8 illustrates a multi-piston actuator assembly, one skilled in the art should appreciate that the present invention can be used with a single piston actuator. A static piston 260 is used to maintain air-pressure on the lower side of each actuating piston, and a stroke limiting mechanism 270 acts as a positive stop for the piston(s) 230a. In FIG. 8, the stroke limiting mechanism 270 is a set screw 271.

Figure 9:
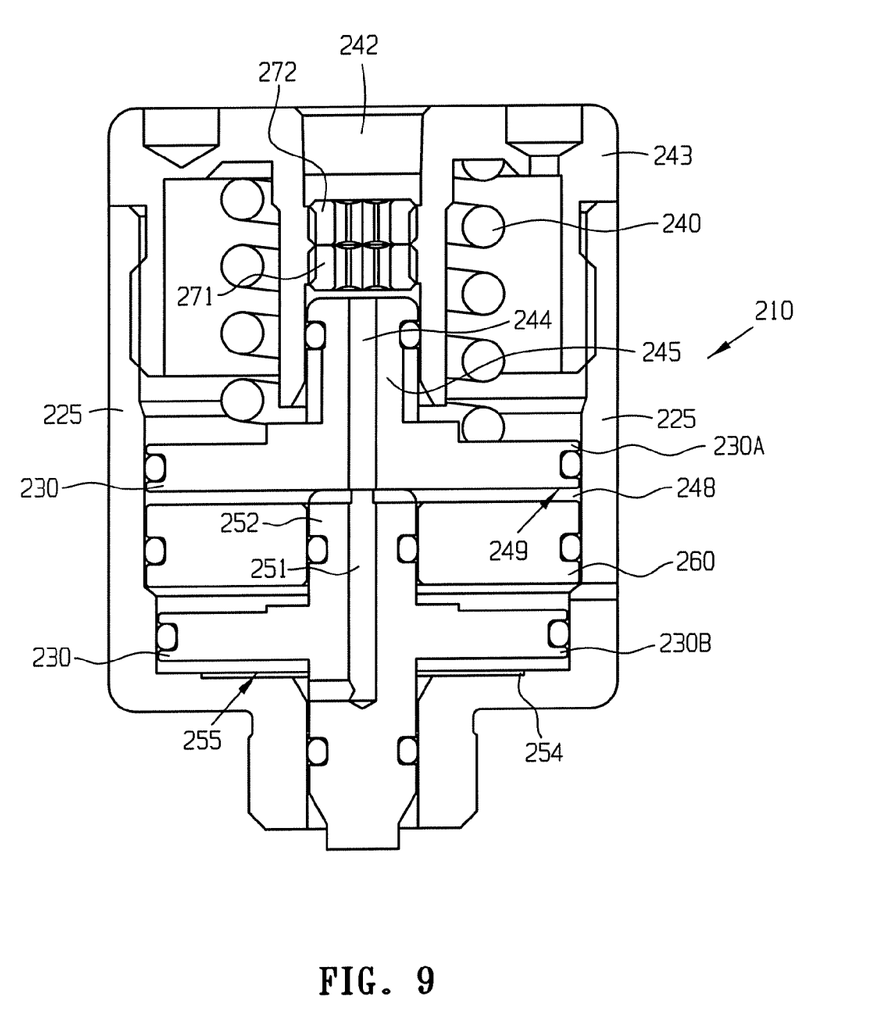
FIG. 9. is a cross-sectional view of an actuator incorporating an adjustable stop mechanism including two set screws.

As the stem 245 repeatedly contacts the set screw 271, the set screw may loosen. As such, a mechanism to secure the set screw 271 in position may be used to prevent loosening. FIG. 9 illustrates one embodiment, wherein a second set screw 272 is used to lock the first set screw 271 into position. In another embodiment, a locking material or glue such as, for example, locktite, is used to lock the set screw 271 into position. In another embodiment, the set screw 271 is locked into position through an interference fit. This can be achieved by changing the pitch of the threads to provide an interference fit. One skilled in the art should appreciate that any convention means of providing an interference thread fit can be employed to secure the set screw in position.

Figure 10:
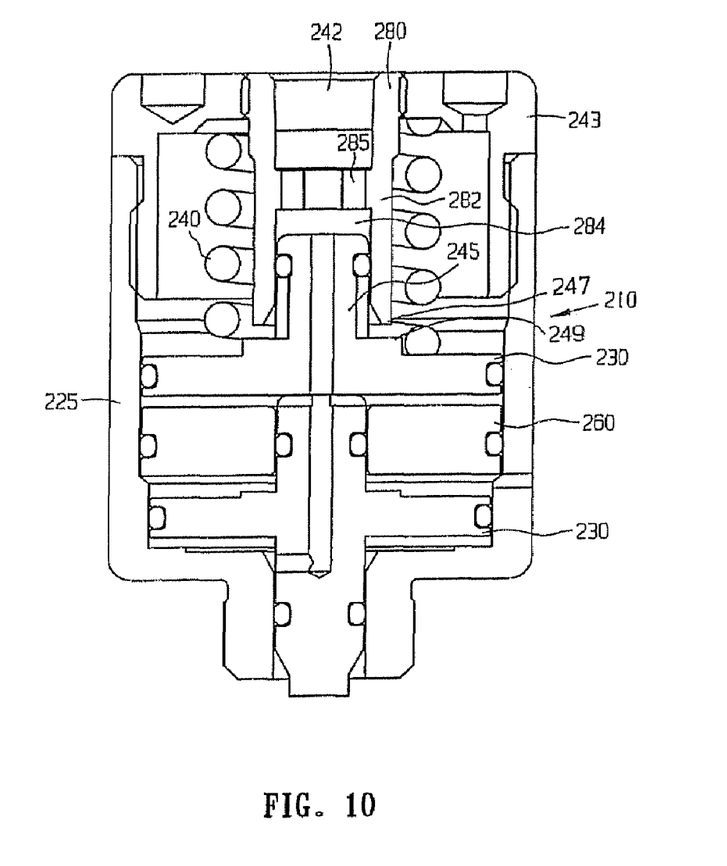
FIG. 10 is a cross-sectional view of an actuator incorporating a one-piece port adjustable stop mechanism.

In FIG. 10, a one-piece adjustable port 280 is used to provide the piston stroke limitation. The one-piece adjustable port 280 is threaded into the end cap 243. The one-piece adjustable port 280 is comprised of a generally cylindrical shaft 282 with a counterbore 284 that receives the stem 245 of the upper piston 230a. The cylindrical shaft 282 includes an end portion 247 that contacts raised step portion 249 of the piston 230. This contact provides a positive stop for the piston 230. The position of that the piston 230 is stopped can be varied depending on the adjustment of the cylindrical shaft 282. If the stroke of the piston 230 is desired to be smaller, the cylindrical shaft 282 is adjusted such that the end portion 247 protrudes further into the actuator housing 225, thereby providing contact with the raised portion 249 of the piston 230 with less axial movement of the piston. In other embodiments, a bridge 285 is disposed between the inlet port 242 and the counterbore 284. The stem 245 contacts the bridge 285 when the actuator 210 is in the open position. This provides a positive stop for the actuator piston 230 thereby limiting the piston stroke. The bridge 285 can be used alone, or in connection with the raised portion 249 contact with the end portion 247 the cylindrical shaft 282. The threaded engagement between the one-piece adjustable port 280 and the end cap 243 provides for a means of adjusting the stroke height. The threaded engagement between the actuator housing 225 and the end cap 243 may provide an additional means of adjusting the stroke height.

Figure 11:
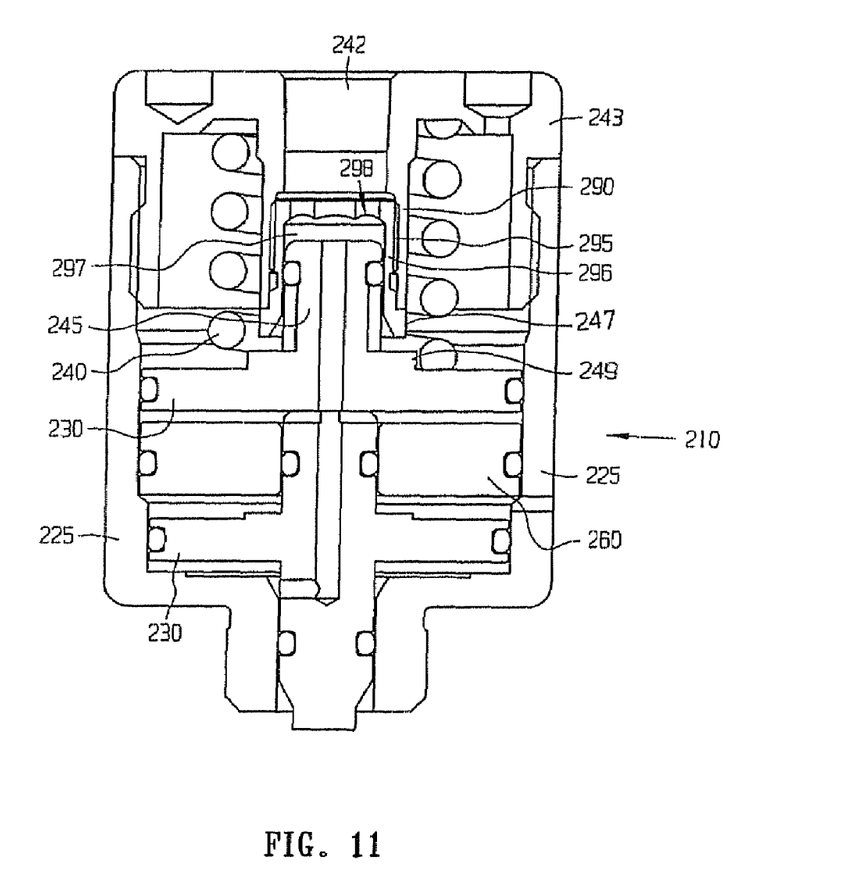
FIG. 11 is a cross-sectional view of an actuator incorporating a two-piece port adjustable stop mechanism.

In FIG. 11, a two-piece adjustable port 290 is used to provide the piston stoke limitation. A threaded stroke limitation cap 295 is threaded into the end cap 243 at the end opposite of the inlet port 242. The stroke limitation cap 295 is comprised of a generally cylindrical shaft 296 with a counterbore 297 that receives the stem 245 of the upper piston 230a. A positive stop can be achieved by the contact between the end portion 247 of the cylindrical shaft 296 and the raised portion 249 of the piston 230, or between the end 298 of the counterbore 297 and the stem 245. The threaded engagement between the stroke limitation cap 295 and the end cap 243 provides for a means of adjusting the stroke height. The threaded engagement between the actuator housing 225 and the end cap 243 may provide an additional means of adjusting the stroke height.

Figure 12:
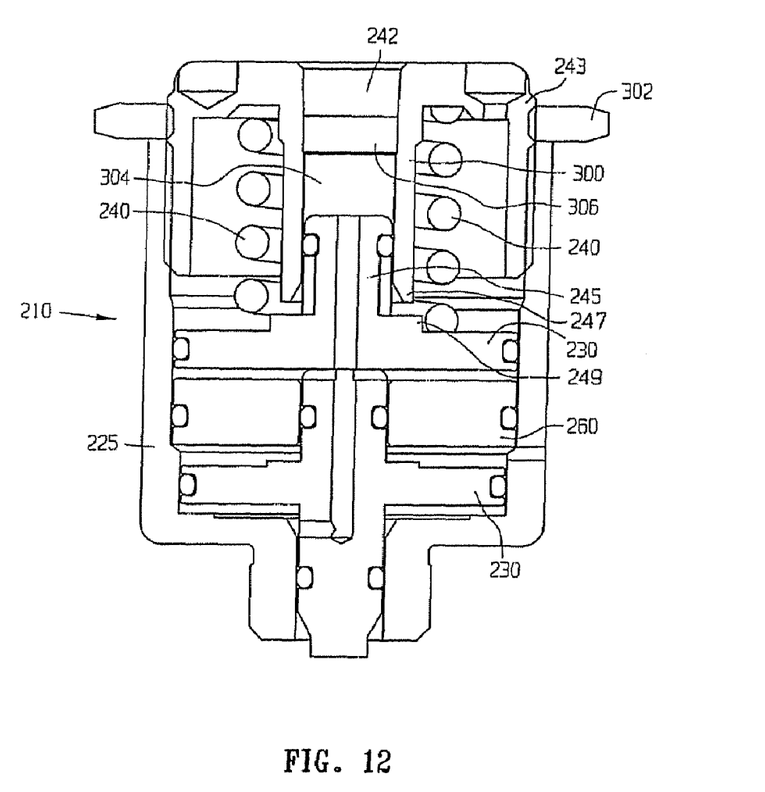
FIG. 12 is a cross-sectional view of an actuator including a side pin for securing an adjustable end cap.

In FIG. 12, an end cap 243' with an integral stroke limiting mechanism 300 is shown. The end cap 243' is threaded onto the actuator housing 225 and then secured in place by a lock nut or pin 302. The stroke limiting mechanism 300 is comprised and end portion 247 of a shaft 300 that contacts a raised portion 249 of piston 230. Alternatively, or in addition to the end portion stroke limitation, a bridge can be positioned at 306 that would separates the inlet port 242 from the counterbore 304 and provide a positive stop with the stem 243 of the piston 230. When a bridge is positioned at 306 is used, the stem 243 of the upper piston 230a is received in the counterbore 304 and contacts the bridge to provide a positive stop for the upper piston 230a. In each of these embodiments, the threaded engagement between the end cap 243' and the actuator housing 225 provides for a means of adjusting the stroke height.

In each of the embodiments shown in FIGS. 8-12, the stoke limitation mechanism 270 can provide a means for controlling the flow of material through the valve. The stroke limitation mechanism 270 can be adjusted such as to change the stroke height. In this manner, the flow of the material through the valve can be controlled. For example, is the stroke height was such that the valve diaphragm would be positioned to only half open the valve passageway, the actuator can be used to control the between normally open or normally closed and a half-open position. Furthermore, since the stroke height can be limited, proximity sensors can be used to determine the position of the actuator piston 230. In the case of prior art actuators, the additional travel distance of the actuator piston frequently takes the piston out of the range of most conventional proximity sensors. The stroke limitation mechanisms disclosed herein limit the stroke height, and thereby allow the piston the remain within the range of convention proximity sensors.

Through the adjustment of the stop mechanism, the stroke of an actuator can be set to a predetermined distance. For example, frequently an actuator with a stroke larger than the stroke of a valve diaphragm is used. In such cases, the actuator piston will travel a greater distance than is required to operate the valve. This over-travel wears on the piston and piston seals and may cause distortion of the diaphragm if the diaphragm is forced to travel a greater distance and it is designed for. By incorporating the stroke limitation mechanisms described herein, the actuator stroke can be set to the same distance as the valve diaphragm stroke. Furthermore, since these adjustments can be made from the outside of the valve assembly, the stroke can be adjusted without the disassembly of the valve assembly.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

The invention claimed is:

1. A valve actuator comprising: at least one piston contained within an actuator housing; and an adjustable member having a surface that is positionable to selectively set a limit position where at least a portion of said at least one piston engages the adjustable member to stop the at least one piston at the limit position, wherein the adjustable member is adjustable from outside the valve actuator, wherein the adjustable member is configured to communicate pressurized fluid through an opening in the adjustable member against the at least one piston to move the at least one piston against at least atmospheric pressure and towards the limit position.

2. The valve actuator of claim 1, wherein said adjustable member defines a one-piece actuator inlet port.

3. The valve actuator of claim 2, wherein said adjustable member comprises a shaft that engages said at least one piston to limit axial movement of said at least one piston.

4. The valve actuator of claim 1, wherein said adjustable member defines one piece of a two-piece actuator inlet port.

5. The valve actuator of claim 4, wherein said adjustable member comprises a shaft that engages said at least one piston to limit axial movement of said at least one piston.

6. The valve actuator of claim 1, wherein said adjustable member comprises a first set screw that is threadably engaged with said actuator housing.

7. The valve actuator of claim 6, further comprising a securing mechanism for preventing rotation of said first set screw.

8. The valve actuator of claim 7, wherein said securing mechanism comprises a second set screw, assembled to the actuator housing to engage said first set screw.

9. The valve actuator of claim 1, further comprising a biasing member that biases said at least one piston with respect to said adjustable member.

10. The valve actuator of claim 1, wherein said valve actuator is assembled to a valve comprising a valve member and a valve seat, such that said piston is coupled to the valve member to control movement of the valve member with respect to the valve seat.

11. The valve actuator of claim 10, wherein said adjustable member is adapted to limit movement of the valve member in an opening direction.

12. The valve actuator of claim 10, further comprising a spring adapted to bias the valve member in a closing direction.

13. The valve actuator of claim 1, wherein said adjustable member engages a stem portion of the piston.

14. The valve actuator of claim 1, wherein said at least one piston comprises a flow channel for passage of fluid applied to the actuator inlet port.

15. The valve actuator of claim 1, wherein the actuator housing comprises an end cap adapted to receive said adjustable member.

16. The valve actuator of claim 15, wherein the end cap is assembled to a base portion of said actuator housing.

17. The valve actuator of claim 1, wherein the at least one piston comprises first and second pistons.

18. The valve actuator of claim 1, wherein the at least one piston comprises a piston opening configured to communicate pressurized fluid through the piston opening and against a surface of the at least one piston facing away from the limit position.

19. A valve actuator comprising: at least one piston contained within an actuator housing; and an adjustable member having a surface that is positionable to selectively set a limit position where at least a portion of said at least one piston engages the adjustable member to stop the at least one piston at the limit position, wherein the adjustable member comprises a first set screw assembled to an actuator inlet port, the adjustable member being adjustable from outside the valve actuator, wherein the adjustable member is configured to communicate pressurized fluid through an opening in the adjustable member against the at least one piston to move the at least one piston against at least atmospheric pressure and towards the limit position.

20. The valve actuator of claim 19, further comprising a securing mechanism for preventing rotation of said first set screw.

21. The valve actuator of claim 19, wherein said securing mechanism comprises a second set screw, assembled to the actuator inlet port to engage said first set screw.

22. The valve actuator of claim 19, further comprising a biasing member that biases said at least one piston with respect to said adjustable member.

23. The valve actuator of claim 19, wherein said valve actuator is assembled to a valve comprising a valve member and a valve seat, such that said piston is coupled to the valve member to control movement of the valve member with respect to the valve seat.

24. The valve actuator of claim 23, wherein said adjustable member is adapted to limit movement of the valve member in an opening direction.

25. The valve actuator of claim 23, further comprising a spring adapted to bias the valve member in a closing direction.

26. The valve actuator of claim 19, wherein said adjustable member engages a stem portion of the piston.

27. The valve actuator of claim 19, wherein said at least one piston comprises a flow channel for passage of fluid applied to the actuator inlet port.

28. The valve actuator of claim 19, wherein the actuator housing comprises an end cap adapted to receive said adjustable member.

29. The valve actuator of claim 28, wherein the end cap is assembled to a base portion of said actuator housing.

30. A valve actuator comprising: at least one piston contained within an actuator housing; an adjustable member having a surface that is positionable to selectively set a limit position where at least a portion of said at least one piston engages the adjustable member to stop the at least one piston at the limit position, and a spring that biases said at least one piston away from said adjustable member, wherein the adjustable member is configured to communicate pressurized fluid through an opening in the adjustable member against the at least one piston to move the at least one piston against at least atmospheric pressure and towards the limit position.

31. A valve actuator comprising: at least one piston contained within an actuator housing; an adjustable member having a surface that is positionable to selectively set a limit position where at least a portion of said at least one piston engages the adjustable member to stop the at least one piston at the limit position; and a spring that biases said at least one piston away from said adjustable member, wherein the adjustable member comprises a first set screw assembled to an actuator inlet port, wherein the adjustable member is configured to communicate pressurized fluid through an opening in the adjustable member against the at least one piston to move the at least one piston against at least atmospheric pressure and towards the limit position.

32. A valve actuator comprising: at least one piston contained within an actuator housing; an adjustable member having a surface that is positionable to selectively set a limit position where at least a portion of said at least one piston engages the adjustable member to stop the at least one piston at the limit position, and a biasing member that biases said at least one piston with respect to said adjustable member, wherein the adjustable member is configured to communicate pressurized fluid through an opening in the adjustable member against the at least one piston to move the at least one piston against at least atmospheric pressure and towards the limit position.

33. The valve actuator of claim 32, wherein the biasing member comprises a spring.

34. The valve actuator of claim 32, wherein the biasing member biases said at least one piston away from said adjustable member.

35. A valve actuator comprising: at least one piston contained within an actuator housing; an adjustable member having a surface that is positionable to selectively set a limit position where at least a portion of said at least one piston engages the adjustable member to stop the at least one piston at the limit position; and a biasing member that biases said at least one piston with respect to said adjustable member, wherein the adjustable member comprises a first set screw assembled to an actuator inlet port, wherein the adjustable member is configured to communicate pressurized fluid through an opening in the adjustable member against the at least one piston to move the at least one piston against at least atmospheric pressure and towards the limit position.

36. The valve actuator of claim 35, wherein the biasing member comprises a spring.

37. The valve actuator of claim 35, wherein the biasing member biases said at least one piston away from said adjustable member.

* * * * *

UNITED STATES PATENT AND TRADEMARK OFFICE
CERTIFICATE OF CORRECTION

PATENT NO. : 7,337,805 B2 Page 1 of 1
APPLICATION NO. : 10/708495
DATED : March 4, 2008
INVENTOR(S) : Ronnie Browne et al.

It is certified that error appears in the above-identified patent and that said Letters Patent is hereby corrected as shown below:

On the front page of the patent, Section (75) Inventors:, the spelling of the first named inventor should read: --Ronnie Browne--

On the front page of the patent, in the Abstract, last line, "vale" should read --valve--.

Signed and Sealed this

Seventeenth Day of June, 2008

JON W. DUDAS
*Director of the United States Patent and Trademark Office*